United States Patent [19]

Karmazin

[11] Patent Number: 4,710,051
[45] Date of Patent: Dec. 1, 1987

[54] DEVICE FOR FASTENING A CLOSED CASING

[76] Inventor: Jan E. L. Karmazin, Norregatan 5, S-230 10 Skanör, Sweden

[21] Appl. No.: 866,768

[22] Filed: May 27, 1986

[51] Int. Cl.⁴ .............................. F16B 7/04; B07B 1/49
[52] U.S. Cl. ................................... 403/227; 403/372; 209/403
[58] Field of Search ............... 403/373, 372, 366, 369, 403/338, 221, 222, 225, 226, 227, 405.1, 5, 370; 209/402, 403, 406

[56] References Cited

U.S. PATENT DOCUMENTS

| | | | |
|---|---|---|---|
| 2,460,981 | 2/1949 | Francisco, Jr. et al. | 403/225 |
| 3,295,871 | 1/1967 | Naimer | 403/370 X |
| 3,341,013 | 9/1967 | Moulton . | |
| 3,352,418 | 11/1967 | Swallow . | |
| 3,776,382 | 12/1973 | Wright et al. . | |
| 3,861,815 | 1/1975 | Landaeus | 403/372 |
| 4,025,214 | 5/1977 | Spieth | 403/372 |
| 4,200,407 | 4/1980 | Bianco | 403/373 |
| 4,222,310 | 9/1980 | Garrett et al. | 403/372 |
| 4,601,600 | 7/1986 | Karlsson | 403/338 |

FOREIGN PATENT DOCUMENTS

C79216 5/1955 Denmark .
B116411 1/1970 Denmark .

*Primary Examiner*—C. J. Husar
*Assistant Examiner*—Peter M. Cuomo
*Attorney, Agent, or Firm*—Shapiro and Shapiro

[57] ABSTRACT

A device for fastening a closed casing, such as a wire cloth, which should form the circumferential surface of a cylinder, such as a screening drum, has a supporting member with a circularly cylindrical outer surface which is intended to be inserted in the casing at one end thereof and has substantially the same circumference as the casing. The supporting member has a circumferential groove in its outer surface. A circumferential engagement element which is made of an elastic material is so mounted in the groove that its outer surface is located on substantially the same level as the outer surface of the supporting member. A mounting ring is disposed around the engagement element. A pressure applying mechanism is adapted to clamp the casing between the engagement element and the mounting ring by deforming the engagement element in such a manner that at least the portion of the outer surface of the engagement element which is inserted farthest in the casing is raised to a level above the outer surface of the supporting member.

6 Claims, 9 Drawing Figures

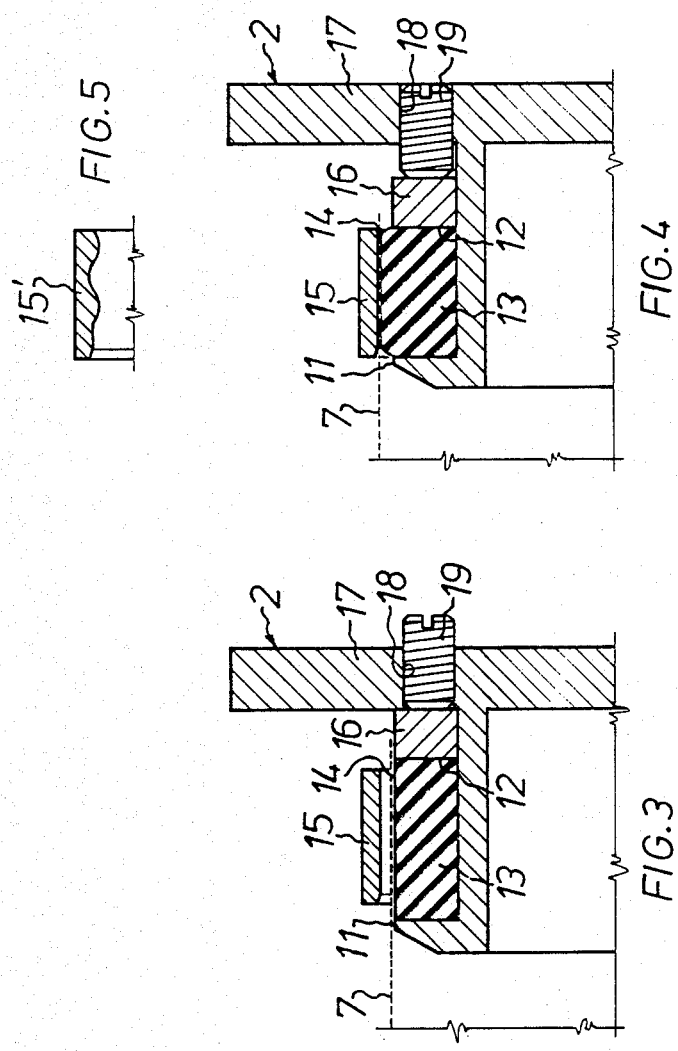

DEVICE FOR FASTENING A CLOSED CASING

The present invention relates to a device for fastening a closed casing, such as a wire cloth, which should form the circumferential surface of a cylinder, such as a screening drum, said device having a supporting member with a circularly cylindrical outer surface which is intended to be inserted in said casing at one end thereof and has substantially the same circumference as the casing.

In the screening of suspensions of different kinds, use is often made of screening drums in which the circumferential surface consists of a wire cloth of e.g. stainless steel or plastic material. In prior art screening drums, the wear of the wire cloth is so substantial that the wire cloth must be replaced after very short times of operation. This means that production must be interrupted at relatively short intervals. Moreover, replacing the wire cloths in the known screening drums is a relatively complicated and time consuming operation. Naturally, the wear of the wire cloth largely depends on the function and mode of operation of the screening drum employed and on the type of suspension being screened. However, it has also been found that the way of stretching the wire cloth on the drum is of decisive importance for the wear of the wire cloth and, hence, the efficiency of production.

A special object of the present invention therefore is to provide a device for fastening a wire cloth on a supporting member which consists of an end wall element of a screening drum, in such a manner that a considerable reduction of the wear of the wire cloth during operation of the screening drum is obtained as compared with the wear of wire cloths in previously known screening drums.

More generally, the object of the present invention is to provide a device for simple and reliable fastening of a closed casing on a supporting member to be inserted in the casing at one end thereof.

According to the present invention, this object is achieved by a device which is of the type stated by way of introduction and which is characterized in that the supporting member has a circumferential groove in its outer surface, that a circumferential engagement element consisting of an elastic material is so mounted in the groove that its outer surface is located on substantially the same level as the outer surface of the supporting member, that a mounting ring is disposed around the engagement element and that a pressure means is adapted to clamp the casing between the engagement element and the mounting ring by deforming the engagement element in such a manner that at least the portion of the outer surface of the engagement element which is inserted farthest in the casing is raised to a level above the outer surface of the supporting member.

In one embodiment of the invention which is especially suited for fastening a fine-meshed circumferential wire cloth, one side wall of the groove consists of a pressure ring which is mounted on the supporting member and is axially displaceable by clamping means and, together with these clamping means, forms said pressure means, and the mounting ring serves as an abutment against which the outer surface of the engagement element is raised for clamping the wire cloth. The opening defined by the inner surface of the mounting ring may then be circularly cylindrical or have circular cross-section with a varying diameter over the axial extent of the opening.

In another embodiment of the invention which is especially suited for mounting a wire cloth with wider meshes, the mounting ring is a clamping ring and forms said pressure means, said clamping ring having a smaller axial width than the engagement element and being located axially outside the portion of the engagement element which is inserted farthest in the casing. When the diameter of the casing is substantial, the clamping ring is preferably made up of several ring segments each of which has an element which is adapted to urge the ring segment against the engagement element.

The invention will now be described in greater detail hereinbelow with reference to the accompanying drawings.

FIGS. 3 and 4 are sectional views showing an embodiment of the device according to the present invention as used in the screening drum of FIGS. 1 and 2.

FIG. 5 is a sectional view showing another design of a mounting ring in the embodiment according to FIGS. 3 and 4

Figure 1:
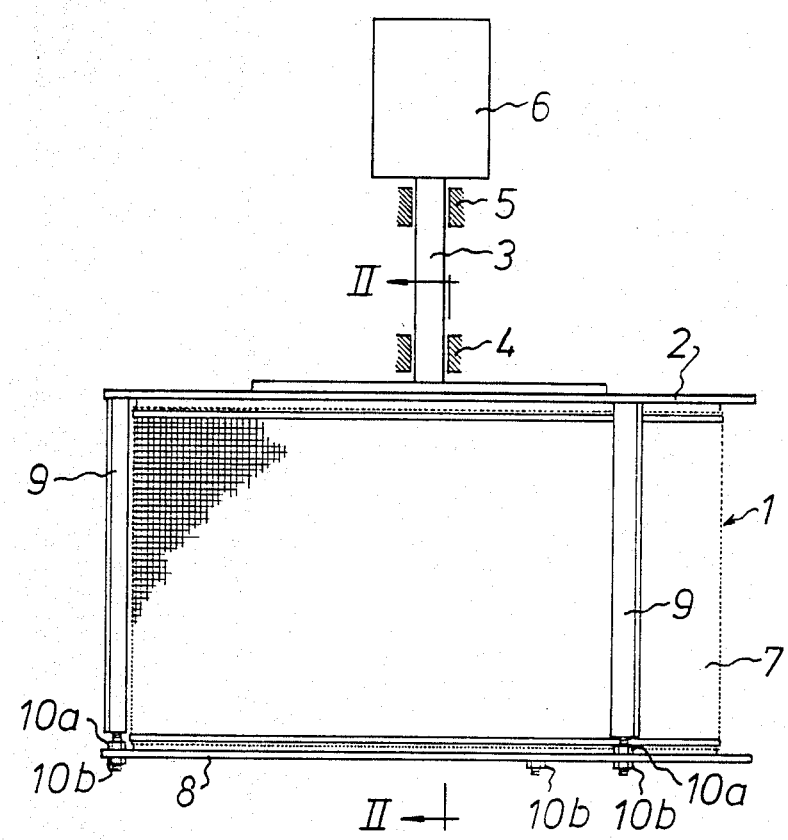
FIG. 1 is a top plan view of a screening drum in which a device according to the present invention is used at either end.
Figure 2:
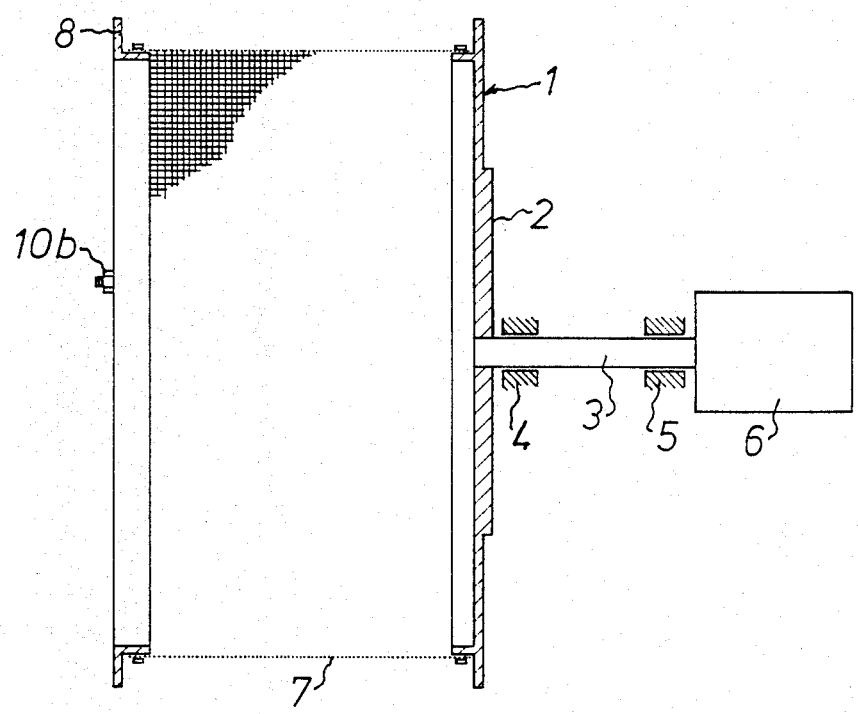
FIG. 2 shows the screening drum in a sectional view along the line II—II in FIG. 1.

The screening drum 1 shown in FIGS. 1 and 2 has an end wall element 2 which is in the form of a disk and is provided with a horizontal shaft 3 by means of which the drum 1 is supported and mounted in two bearings 4 and 5. The shaft 3 is connected to a motor 6 for rotating the drum 1.

The circumferential surface of the screening drum 1 consists of a wire cloth 7 which in the illustrated screening drum 1 is a fine-meshed cloth having a mesh aperture of 45-63 $\mu$m. The wire cloth 7 is woven from threads of a corrosion-resistant material, such as stainless steel, the thread diameter being 35-40 $\mu$m. The warp threads extend around the drum 1 while the weft threads extend axially along the drum 1. The wire cloth 7 may also be made of a plastic material, such as polyester, amide or aramide resin. The wire cloth 7 is glued with a certain overlapping by means of epoxy or so-called hot-melt glue so as to form an endless or closed cloth and is fixed to the end wall element 2 by means of a fastening device according to the present invention as described in greater detail hereinbelow, and to the other end wall element 8 of the drum, which consists of a ring, by means of a similar fastening device. The ring 8 is connected to the end wall element 2 by means of three spacer rods 9 such that it is displaceable with respect the end wall 2 for tensioning the wire cloth in the axial direction. The ring 8 is moved to a suitable position, as regards the axial tension of the wire cloth 7, relative to the end wall element 2 by means of internal nuts 10a and is locked in this position by means of external nuts 10b, the nuts 10a, 10b being screwed on the threaded ends of the spacer rods 9.

The device by means of which the wire cloth 7 is secured to the respective end wall elements 2 and 8 will now be described in greater detail with reference to FIGS. 3 and 4. FIGS. 3 and 4 show the end wall element 2 only, but, as mentioned above, the arrangement is the same for the end wall element 8. The end wall element 2 forms a supporting member having a circularly cylindrical surface 11 which is inserted in the wire cloth 7 at one end thereof and which has substantially the same diameter as the wire cloth 7. See FIG. 3. The end wall element 2 has a circumferential groove 12 in the surface 11. An engagement ring 13 which is made of rubber or other elastic material and, when in a non-deformed state (FIG. 3), has the same cross-sectional shape as the groove 12, is mounted in the groove 12 so that its outer surface 14 is located on the same level as the surface 11 (i.e., so that its outer circumference aligns with surface 11 in an axial direction). A mounting ring 15 whose inner diameter is slightly larger than the outer diameter of the surfaces 11 and 14, is mounted around the engagement ring 13. The groove 12 is delimited at its right-hand side in FIGS. 3 and 4 by a pressure ring 16 whose outer surface forms a part of the surface 11 and which fills the space between the engagement ring 13 and a flange 17 on the end wall element 2. The flange 17 has a plurality of threaded holes 18 which are evenly distributed along a circle and aligned with ring 16. In each hole 18, a screw 19 is threadedly received, and the respective screws may be brought to bear on the pressure ring 16 (each with its left-hand end in FIGS. 3 and 4).

When the screws 19 are screwed further into the flange 17 from the position shown in FIG. 3 to the position shown in FIG. 4, the engagement ring 13 will be compressed in the axial direction, such that its outer surface 14 is forced outward from the surface 11. The wire cloth 7 will thus be lifted and clamped between the engagement ring 13 and the mounting ring 15 which forms an abutment for the engagement ring 13. Upon this tightening of the screws 19, the wire cloth 7 will thus be stretched tangentially (i.e. the warp threads over the end wall element 2 are stretched) and evenly expanded such that uniform mounting without any folds or creases is obtained. The mounting ring or abutment 15 holds the wire cloth 7 pressed against the outer surface 14 of the engagement ring 13, such that a frictional engagement is obtained between the wire cloth 7 and the surface 14. Since the elastic material of the ring 13 penetrates upwards into the meshes of the wire cloth 7, there will be obtained a certain positive engagement between the wire cloth 7 and ring 13.

When the wire cloth 7 has been secured to both end wall elements 2 and 8, it is stretched in the abovementioned way in the axial direction by means of the spacer rods 9 and the nuts 10a. The weft threads will then be tensioned and the warp threads located between the end wall elements 2 and 8 will be undulated correspondingly, the warp threads being practically untensioned. Thus the warp threads will protrude up above the tensioned weft threads and protect them from particle wear.

In the embodiment illustrated in FIGS. 3 and 4, the mounting ring 15 has a circularly cylindrical inner surface. The opening defined by the inner surface of the mounting ring may, as shown in FIG. 5 for a mounting ring 15', also have a varying diameter over the axial extent of the opening to further increase the ability of the fastening device to resist the forces which occur when the wire cloth 7 is tensioned in the axial direction.

Figure 6:
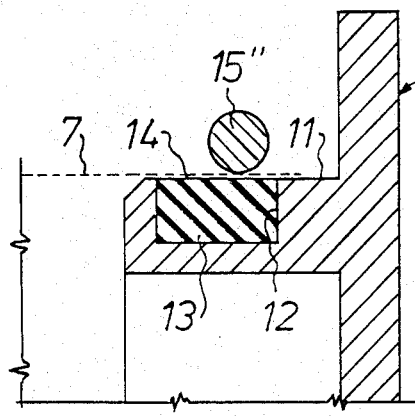
FIGS. 6 and 7 are sectional views showing a second embodiment of the device according to the present invention.
Figure 7:
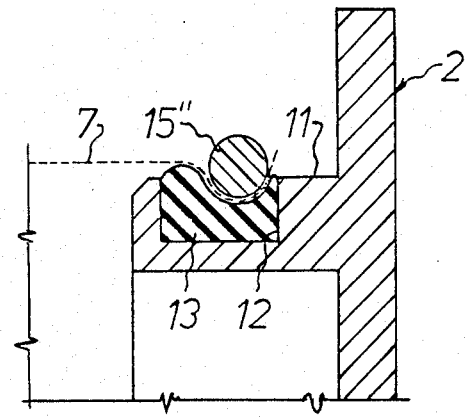

The second embodiment illustrated in FIGS. 6 and 7 differs from the first embodiment according to FIGS. 3 and 4 substantially in that its mounting ring 15" is a clamping ring and, thus, is an "active" ring, whereas the mounting ring 15, like the mounting ring 15' in FIG. 5, is a counter-ring and, thus, is a "passive" ring. In this second embodiment, the groove 12 is also delimited at its right-hand side in FIGS. 6 and 7 by a stationary wall which is formed integrally with the end wall element 2 (or 8). Thus, the second embodiment does not have pressure ring and screws corresponding to the pressure ring 16 and the screws 19 in the first embodiment. The mounting ring 15" which, as mentioned above, is a clamping ring has circular cross-section with a diameter which is substantially equal to half the axial width of the groove 12 and, hence, of the engagement ring 13, and is located axially outwardly of the portion of the engagement ring 13 inserted farthest in the wire cloth casing. As the clamping ring 15" is tightened, it will be pressed into a portion of the elastic engagement ring 13 so as to deform it, whereby another portion thereof, with the displaced volume, is forced outwardly beyond the surface 11. As in the first embodiment, the wire cloth 7 will then be raised and tensioned tangentially over the raised portion of the engagement ring 13, such that uniform mounting without any creases is obtained.

Figure 8:
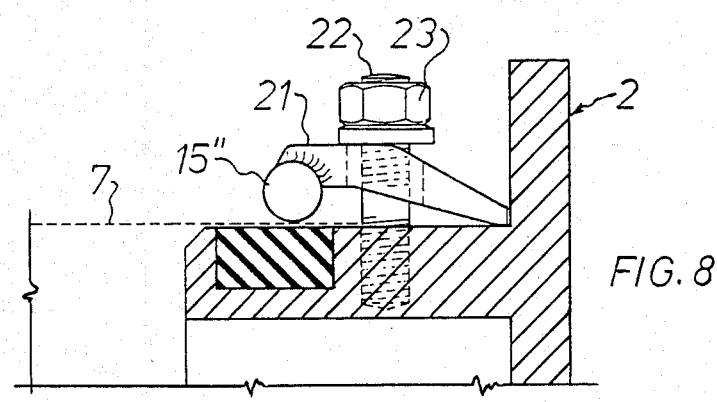
FIG. 8 is a sectional view and FIG. 9 a top plan view which show a third embodiment of the device according to the present invention.
Figure 9:
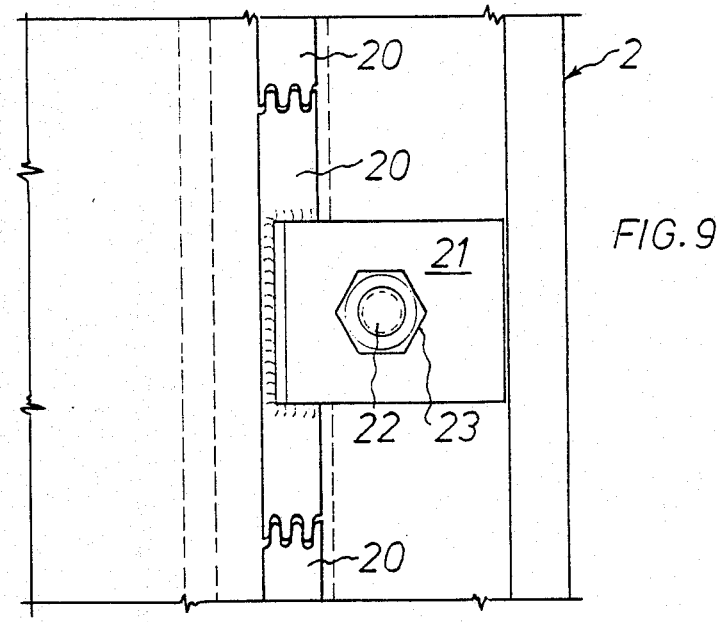

Since the diameter of the screening drum 1 and, thus, of the wire cloth 7 is large, the tension forces in the clamping ring 15" may become too great. To eliminate these tension forces, the ring 15" may be made up of a plurality of ring segments 20 (FIGS. 8 and 9) together forming a clamping ring 15"'. In this case, each ring segment 20 has a flange 21 connected thereto and a threaded pin 22 extending through the flange and screwed into the end wall element 2 (or 8). A nut 23 disposed on the pin 22 may be tightened against the flange 21 in order to urge the clamping ring segment 20 against the engagement ring 13. The clamping ring 15"' consisting of the ring segments 20 acts in the same way as the clamping ring 15" in the embodiment according to FIGS. 6 and 7 but is not subjected to any tangential tension forces.

What I claim and desire to secure by Letters Patent is:

1. Apparatus for use in assembling a screening drum, comprising a circumferentially closed cylindrical wire cloth screen which is open at both ends, and at least one end supporting means attachable to one end of said screen for circumferentially supporting said one end of said screen, said end supporting means including a supporting member having a cylindrical outer surface of substantially the same diameter as said screen and axially insertable into said one end of said screen, an annular elastic engagement element received in a circumferential groove in said cylindrical surface and having an outer circumferential surface of substantially the same diameter as said cylindrical surface so that said engagement element is insertable into said one end of said screen with said cylindrical surface, mounting ring means having an inner diameter slightly greater than the diameter of said screen and receivable over said one end of said screen outwardly of the inserted engagement element, and pressure applying means for effecting circumferential clamping of said screen between said mounting ring means and said elastic engagement element and for deforming said engagement element such that a furthest inserted circumferential portion of said engagement element is forced outward from said cylindrical surface to circumferentially stretch said one end of said screen.

2. Apparatus as claimed in claim 1, characterized in that one side wall of said groove is defined by a pressure ring which is mounted on the supporting member, which is axially displaceable by clamping means and which together with said clamping means forms said pressure means, and that the mounting ring means serves as an abutment against which the outer surface of the engagement element is forced for clamping the screen.

3. Apparatus as claimed in claim 2, characterized in that an inner surface of the mounting ring means is circularly cylindrical.

4. Apparatus as claimed in claim 2, characterized in that an opening defined by the inner surface of the mounting ring means has circular cross-section with a varying diameter over the axial extent of the opening.

5. Apparatus as claimed in claim 1, characterized in that the mounting ring means is a clamping ring and forms said pressure means, said clamping ring having a smaller axial width than the engagement element and being located axially outside said circumferential portion of the engagement element.

6. Apparatus as claimed in claim 5, characterized in that the clamping ring is made up of several ring segments each of which is attached to means for urging that ring segment against the engagement element.

* * * * *